United States Patent [19]

Preeg et al.

[11] 4,445,033

[45] Apr. 24, 1984

[54] METHODS AND APPARATUS FOR ENVIRONMENTAL CORRECTION OF THERMAL NEUTRON LOGS

[75] Inventors: William E. Preeg; Hubert D. Scott, both of Ridgefield, Conn.

[73] Assignee: Schlumberger Technology Corporation, New York, N.Y.

[21] Appl. No.: 302,092

[22] Filed: Sep. 14, 1981

[51] Int. Cl.³ .............................................. G01V 5/10
[52] U.S. Cl. ................................... 250/266; 250/270
[58] Field of Search ............... 250/265, 266, 269, 270, 250/262, 264

[56] References Cited

U.S. PATENT DOCUMENTS

| | | | |
|---|---|---|---|
| 3,509,342 | 4/1970 | Dewan | 250/269 |
| 3,818,225 | 6/1974 | Smith | 250/266 |
| 3,859,524 | 1/1975 | Nelligan | 250/262 |
| 3,890,501 | 6/1975 | Johnstone | 250/265 |
| 4,223,218 | 9/1980 | Jacobson | 250/262 |
| 4,224,516 | 9/1980 | Johnstone | 250/262 |
| 4,350,888 | 9/1982 | Peelman | 250/270 |

OTHER PUBLICATIONS

Randall, "Time Derived Sigma for Pulsed Neutron Capture Logging," Middle East Oil Tech. Conf. of Soc. Petro. Eng., Manama, Bahrain, Mar. 9-12, 1981.

*Primary Examiner*—Alfred E. Smith
*Assistant Examiner*—Carolyn E. Fields
*Attorney, Agent, or Firm*—Brumbaugh, Graves, Donohue & Raymond

[57] ABSTRACT

An on-line environmentally-corrected measurement of the thermal neutron decay time ($\tau$) of an earth formation traversed by a borehole is provided in a two-detector, pulsed neutron logging tool, by measuring $\tau$ at each detector and combining the two $\tau$ measurements in accordance with a previously established empirical relationship of the general form:

$$\tau = \tau_F + A(\tau_F + \tau_N B) + C,$$

where $\tau_F$ and $\tau_N$ are the $\tau$ measurements at the far-spaced and near-spaced detectors, respectively, A is a correction coefficient for borehole capture cross section effects, B is a correction coefficient for neutron diffusion effects, and C is a constant related to parameters of the logging tool. Preferred numerical value of A, B and C are disclosed, and a relationship for more accurately approximating the A term to specific borehole conditions.

24 Claims, 6 Drawing Figures

METHODS AND APPARATUS FOR ENVIRONMENTAL CORRECTION OF THERMAL NEUTRON LOGS

DESCRIPTION

BACKGROUND OF THE INVENTION

1. Field of the Invention

The present invention relates to thermal neutron decay time logging and, more particularly, to novel methods and apparatus for producing thermal neutron decay time measurements which more accurately represent the intrinsic values of thermal neutron decay characteristics of earth formations.

2. Description of Prior Art

In well logging applications, thermal neutron decay time logs provide measurements of the rate of absorption of thermal neutrons in the earth formations traversed by a borehole. The basic physics of the thermal neutron decay time measurement are straightforward; the thermal neutron decay time ($\tau$) is measured by detecting gamma rays produced by thermal neutron capture. This quantity can be converted to the formation macroscopic capture cross section as follows:

$$\Sigma(\text{capture units}) = (4550/\tau)$$

where $\tau$ is the thermal neutron decay time (microseconds) and 1 capture unit $= 10^{-3}$ cm$^{-1}$. Since chlorine is the strongest neutron absorber of common earth elements, $\tau$ is determined largely by the sodium chloride present in the formation water. Hence the decay time log, although useful in open hole logging, finds its principal application in cased wells for differentiating between oil or gas-bearing formations and saltwater-bearing formations, and for monitoring changes in water saturation during the production life of a well.

Thermal neutron decay time logging is provided commercially by the Schlumberger Well Services division of the Schlumberger Technology Corporation, assignee of the present application, under the mark TDT and is a widely accepted and important logging service. In providing this service, Schlumberger employs basically two logging systems, the TDT-K system which is described in U.S. Pat. No. 3,890,501 and the TDT-M system which is described in U.S. Pat. Nos. 4,223,218 and 4,224,516. In both systems, measurements of the thermal neutron decay time are made by first repetitively irradiating the formation with pulses or bursts of high energy neutrons. After each pulse, the rate at which the thermal neutron population decreases is determined by measuring gamma rays produced from capture of thermal neutrons by elements present in the formation and the borehole environment. Two detectors are provided in the tool so that measurements can be made at near and far spacings from the neutron source.

To make quantitative oil saturation determinations using thermal neutron decay time measurements, it is important to take into account how the measured (apparent) neutron decay time of a formation is related to the true neutron decay time implied by the intrinsic capture cross section of the formation. Essentially, two factors can affect the measurement. The first is the spatial diffusion of neutrons from regions of high neutron density to regions of low neutron density, and arises from the fact that the source of neutrons is a point source. The second factor is the presence in the borehole of materials such as the logging tool itself, borehole fluid, casing and cement, all of which typically will have capture cross sections different from the formation capture cross section. Various proposals have been made over the years to correct for these effects. The aforementioned U.S. Pat. No. 3,890,501, for example, describes several alternative techniques for correcting the near spacing detector measurements of $\tau$ and $\Sigma$ ($\tau_N$ and $\Sigma_N$) for diffusion effects to afford values more accurately reflecting the intrinsic $\tau$ and $\Sigma$ ($\tau_{INT}$ and $\Sigma_{INT}$), including (1) the use of diffusion departure (correction) curves and (2) multiplying $\Sigma$ by the $\tau_N/\tau_F$ ratio or a ratio of far detector count rates. The '501 patent also discloses that the far spacing detector $\tau$ and $\Sigma$ measurements ($\tau_F$ and $\Sigma_F$) are less effected by neutron diffusion than the near detector measurements $\tau_N$ and $\Sigma_N$ and that, if desired, the $\tau_F$ measurement can be used in certain circumstances as a diffusion-corrected measurement of $\tau_{INT}$. These diffusion-correction techniques have been used with success in the TDT-K system. More recently, the TDT-M system has been developed which employs sixteen detection time gates to make more effective use of the far-spacing detector in deriving $\tau$ and $\Sigma$ measurements, as described in the aforementioned '218 and '516 patents.

Because the TDT log is such an important service, however, it is desirable to improve the service still further, and in particular more fully to correct the measured values of $\tau$ and $\Sigma$ for environmental effects, including both diffusion effects and borehole capture cross section effects.

SUMMARY

These and other objects are attained, in accordance with the invention, by the provision of methods and apparatus for measuring the thermal neutron decay time $\tau$ of earth formations (and its correlative the macroscopic capture cross section $\Sigma$), in which $\tau$ is measured at each of a near-spaced detector and a farspaced detector, and the two $\tau$ measurements ($\tau_N$ and $\tau_F$) are combined in accordance with a previously-established empirical relationship, including terms for correcting the $\tau$ measurements for the effects thereon of neutron diffusion and borehole capture cross section, to provide an environmentally-corrected measurement of the formation $\tau$ (and $\Sigma$). Measured values of $\tau$ and $\Sigma$ that more accurately represent the intrinsic formation $\tau$ and $\Sigma$ are thereby obtained. Preferably the corrected measurement is made on-line, but, if desired, it may be made remotely from recorded $\tau_N$ and $\tau_F$ measurements or detector count rate data.

The empirical relationship has the following general form:

$$\tau = \tau_F + A(\tau_F - \tau_N B) + C$$

where A represents a correction term or coefficient for the effect on the $\tau$ measurement of the capture cross section of the borehole, B represents a correction term for the effect on the $\tau$ measurement of neutron diffusion, and C is a constant and is related to the source-to-detector spacings and the time delay after burst used in making the $\tau_N$ and $\tau_F$ measurements.

This general form of the empirical relationship for determining $\tau$ was derived by modeling the TDT-K and TDT-M tools using Monte Carlo calculations, and specific values of the correction terms A, B, and C have been determined which are valid for those tool configurations over a wide range of formation and borehole conditions. Thus, A may be within the range of 0 to 3, and suitably is 0.5, B may be within the range of 1.0 to 1.2, and suitably is 1.1, and C may be within the range of 0 to 30 μsec., and suitably is 10 μsec.

For a more accurate approximation of the borehole capture cross section term to specific borehole conditions, A may be determined from the relationship:

$$A = 0.5(1 + 0.5\Sigma/\text{eff.}\Sigma_{BH}),$$

in which eff. $\Sigma_{BH}$ is the effective borehole capture cross section and is given by:

$$\text{eff. } \Sigma_{BH} = \frac{\int \Sigma(r_i)\Psi(r_i)dA_b}{\int \Psi(r_i)dA_b}$$

where $\Sigma(r_i)$ and $\Psi(r_i)$ are the capture cross section and the neutron flux, respectively, in the various materials $i = 1, 2, \ldots n$ in the borehole, as is described more fully hereinafter.

BRIEF DESCRIPTION OF THE DRAWINGS

The foregoing and other objects, features and advantages of the invention will be more readily appreciated from the following description of illustrative embodiments thereof, taken in conjunction with the accompanying drawings, in which.

DETAILED DESCRIPTION OF EXEMPLARY EMBODIMENTS

In accordance with the present invention, improved techniques for processing the near and far detector $\tau$ and $\Sigma$ measurements, to account for diffusion and borehole capture effects, have been developed by modeling the logging tool response using three-dimensional, time-dependent, coupled neutron-gamma ray Monte Carlo calculations. The Monte Carlo method is a random sampling technique for simulating the transport of neutrons and gamma rays in a medium. In the Monte Carlo treatment, a particle history is simulated on the computer as a sequence of random events. Particles are emitted from the source at random and the transport is a succession of straight flight paths which are interrupted by collision events. The lengths of the flight path to the subsequent interaction is a random variable depending on the geometry and the cross sections of the medium. The outcome of the interaction, such as the type, energy and direction of radiation produced, is also governed by random variables. In the simple analog form of Monte Carlo, particles are tracked until they either are absorbed or escape from the system geometry, at which point the history is terminated and a new source particle is selected.

This treatment of each physical process is an advantage of the Monte Carlo method since the modeling tends to be conceptually simpler than numerical methods. Also, complicated three dimensional geometries present no problems for sophisticated computer codes, such as the code SAM-CE used in this application. With the thermal neutron decay time tool, as with all nuclear tools, however, only a very small fraction of the starting source particles or secondary particles reach the detector. For example, only one source neutron in several million may actually produce a count in the detector. Hence modeling of the physical processes is often inadequate by itself, for the simple reason that analog simulation may require excessive amounts of computer time.

To overcome this problem, several techniques have been developed to make the Monte Carlo calculations more efficient. Generally, the object of such techniques is to tailor the computer code closely to fit the problem, since otherwise statistical errors would be unduly large. One technique is to make use of an estimator. In the thermal neutron decay time calculation, problem neutrons are tracked until they reach thermal energy and are captured. At this point, a cascade of capture gamma rays is created with energies characteristic of the capturing nucleus. Before the gamma rays are tracked through the medium, the probability of scattering in the direction of the detector and arriving there without absorption is calculated and this partial result is kept as the detector response. Thus, a perfectly valid detector response may be calculated without ever having a simulated gamma ray actually reach and pass through the detector.

Other efficiency improving techniques make use of various weighting (importance sampling) strategies, with the object of preferentially sampling those particles most likely to produce a score at the detector. For example, if the source neutrons are emitted isotropically, it is reasonable to weight those emitted in a direction away from the detector as less important than those emitted towards the detector. Weighting by space, time, angle, and energy may all be required for good results in a reasonable amount of computer time. For purposes of the Monte Carlo calculations underlying the present invention, a ±3% statistical accuracy or better on the calculated $\Sigma$ was determined to be acceptable.

Using the foregoing criteria, the response of the TDT-K and TDT-M tools was modelled using, for this purpose, source-to-detector spacings (accelerator target to centerline of detector crystal) of approximately thirteen inches for the near detector and twenty-five inches for the far detector. The time delay after the neutron burst used in measuring $\tau$ was two $(2)\tau$. The results of these calculations are shown in part in FIGS. 2–5 herein. These results demonstrate that improved values for the formation $\tau$ and $\Sigma$ can be obtained by combining, in a manner more fully set out hereinafter, the data from both the near and far detectors. The results further demonstrate that the prior art departure curves are useful over only a limited range of borehole and formation cross sections.

Figures 1, 6:
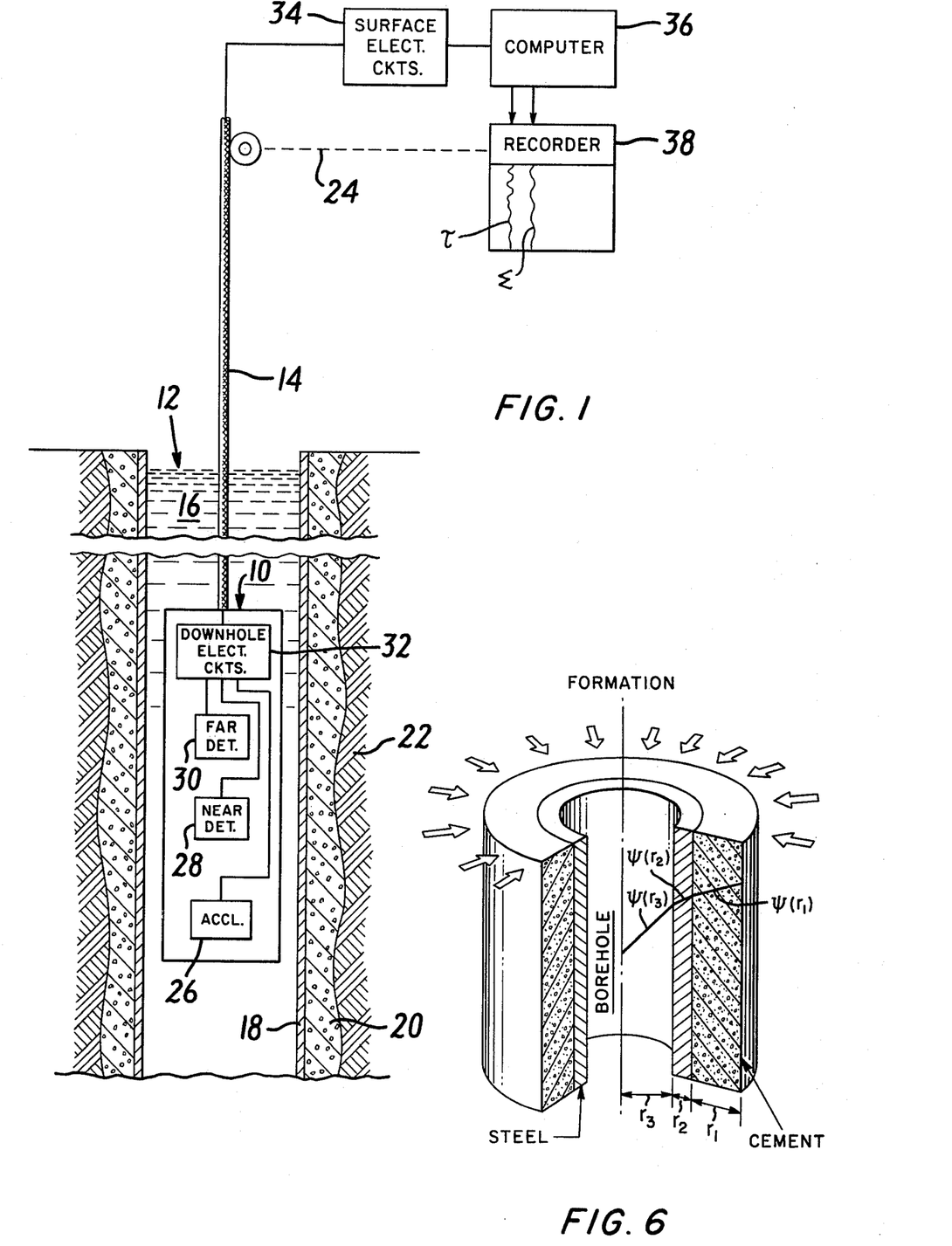
FIG. 1 is a schematic view of a thermal neutron decay time logging system, with the downhole tool in place in a borehole, for making the improved thermal neutron capture measurements in accordance with the invention.
FIG. 6 is a model of a cased borehole illustrating thermal neutron flux into the borehole for the case where eff.$\Sigma_{BH}$ is greater than the formation capture cross section ($\Sigma$).

Turning first to the basics of the logging system, FIG. 1 illustrates an exemplary embodiment of a thermal neutron decay time logging tool useful in practicing the invention. The tool is shown in schematic form only, as the details thereof may be constructed in accordance with the disclosures of the aforementioned U.S. Pat. Nos. 3,890,501, 4,223,218 and 4,224,516, the pertinent portions of which are hereby incorporated by reference.

In general, the tool includes a fluid tight, pressure-and-temperature resistant sonde 10 that is adapted to be suspended in and moved through a borehole 12 by an armored cable 14. The borehole is illustrated as containing a borehole fluid 16 and as including a steel casing 18 and surrounding cement annulus 20. The earth formations are indicated at 22. Although no tubing is shown in the borehole, the sonde 10 may be sized for through-tubing use if desired. The usual hoist and depth-recording devices, indicated schematically at 24, would also be employed, as will be evident to those skilled in the art.

The sonde 10 includes a pulsed neutron accelerator 26 and two radiation detectors 28 and 30 located at near and far spacings, respectively, from the neutron source 26. The accelerator 26 preferably is of the 14-Mev. D,T-type and may be of any suitable construction. It will be understood to include the necessary high-voltage power supply, firing and pulsing circuits (not shown) incident to pulsed accelerator operation. The detectors 28 and 30 may also be conventional, and preferably are gamma ray detectors, e.g. sodium iodide crystal detectors. Neutron detectors, e.g. helium-3 filled proportion counters, may be used if desired. It is assumed hereinafter for purposes of this disclosure that the detectors 28 and 30 are gamma ray detectors.

Electrical power for the downhole tool 10 is supplied over the cable 14 from a power supply (not shown) at the surface. Suitable power supplies (not shown) would likewise be provided in the sonde 10 to drive the detectors 28 and 30 and the other downhole electronics.

Signals generated by the detectors 28 and 30 are shown in FIG. 1 as being applied to downhole electronic circuits 32. These circuits 32 will be understood to include all of amplification, discrimination and processing circuits needed to compute $\tau_N$ and $\tau_F$ from the near and far detector signals and to control the operation of the detectors 28 and 30 and the accelerator 26 pursuant to the disclosure of the '501 patent, or to prepare and transmit the count rate information from the detectors to the surface, pursuant to the alternative disclosure of the '501 patent or the disclosures of the '218 and '516 patents. At the surface, the signals are received in surface electronic circuits 34, where they are decoded, or otherwise converted and restored as required for further processing. Thereafter, they are applied to the computer 36, which may comprise any suitable digital computer such as the PDP-11. If the $\tau$ measurements are computed at the surface, this is done by the computer 36 for each detector 28 and 30, in the manner disclosed in the '501, '218 or '516 patents. The $\tau_N$ and $\tau_F$ (or $\Sigma_N$ and $\Sigma_F$) measurements are then combined by the computer 36 in accordance with the present invention to provide on-line environmentally-corrected $\tau$ and $\Sigma$ measurements that more accurately represent $\tau_{INT}$ and $\Sigma_{INT}$ of the formation. The corrected $\tau$ and $\Sigma$ measurement are recorded as a function of tool depth in conventional fashion in a recorder 38. As noted, the usual depth-recording linkage, indicated schematically at 24, is provided for this purpose.

For the case of an infinite homogeneous medium with a uniformly distributed neutron source, the measured $\tau$ and $\Sigma$ would equal the intrinsic formation $\tau$ and $\Sigma$. As noted and as explained more fully hereinafter, however, the borehole, casing, cement, and the effect of a localized source of neutrons will cause the measured $\tau$ and $\Sigma$ to be different from the intrinsic $\tau$ and $\Sigma$.

As will be appreciated, the detectors 28 and 30 respond to gamma rays both from the formations 22 and from the other materials, such as the borehole fluid 16, steel casing 18 and cement 20, in the borehole environment. The gamma ray count rates for the near and far detectors 28 and 30, calculated using the foregoing Monte Carlo modelling technique, for a 36% porosity sandstone formation containing saturated salt water with a 12" diameter borehole and a 9⅝" casing are compared in FIG. 2. In this comparison, the contribution from gamma rays produced in the borehole, casing, and cement have been combined. Examination of these data shows that, after a time delay of about $2\tau$, the various components can be approximated as exponentials, that the integrated $\tau$ for borehole, steel and cement components has about the same value for both the near and far detectors ($\tau_N=80$ vs. $\tau_F=83$), and that $\tau$ from the formation gamma rays is about 10% higher for the far detector than for the near detector ($\tau_F=101$ vs. $\tau_N=94$). Also, the ratio of the formation count rate component to the borehole count rate component is about two times higher at the far detector than at the near detector. These conclusions have been found to be valid over a wide range of cases (lithologies, porosities, borehole sizes, formation and borehole fluid salinities, casing sizes, open holes, etc.) calculated.

Figure 2:
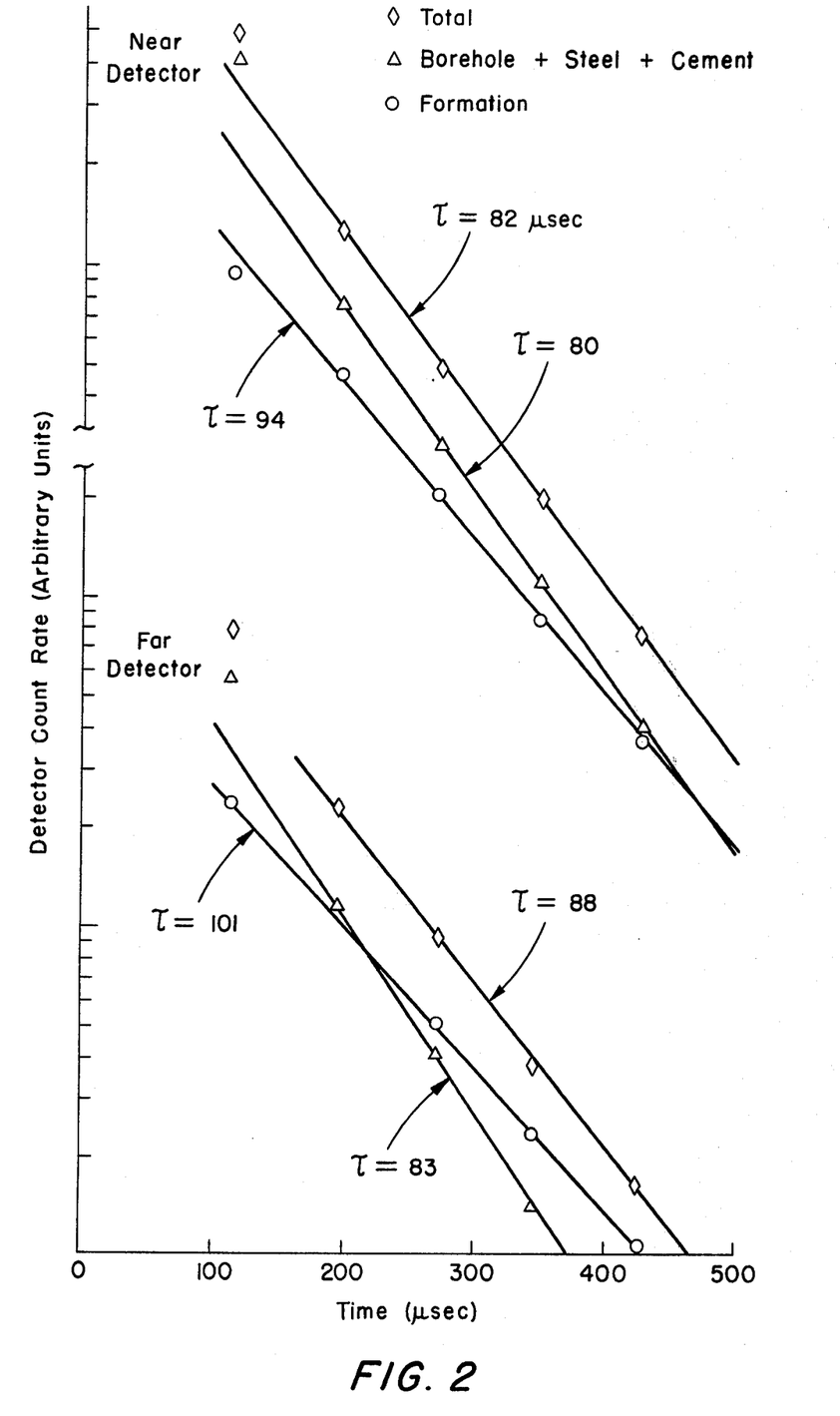
FIG. 2 is a graphical representation of the near and far detector gamma ray count rates vs time (after neutron burst) for the formation, borehole materials and total of a 36% porosity sandstone formation with a 12-inch diameter cemented borehole, a 9⅝-inch steel casing, and saturated salt water in the formation and borehole.
Figure 3:
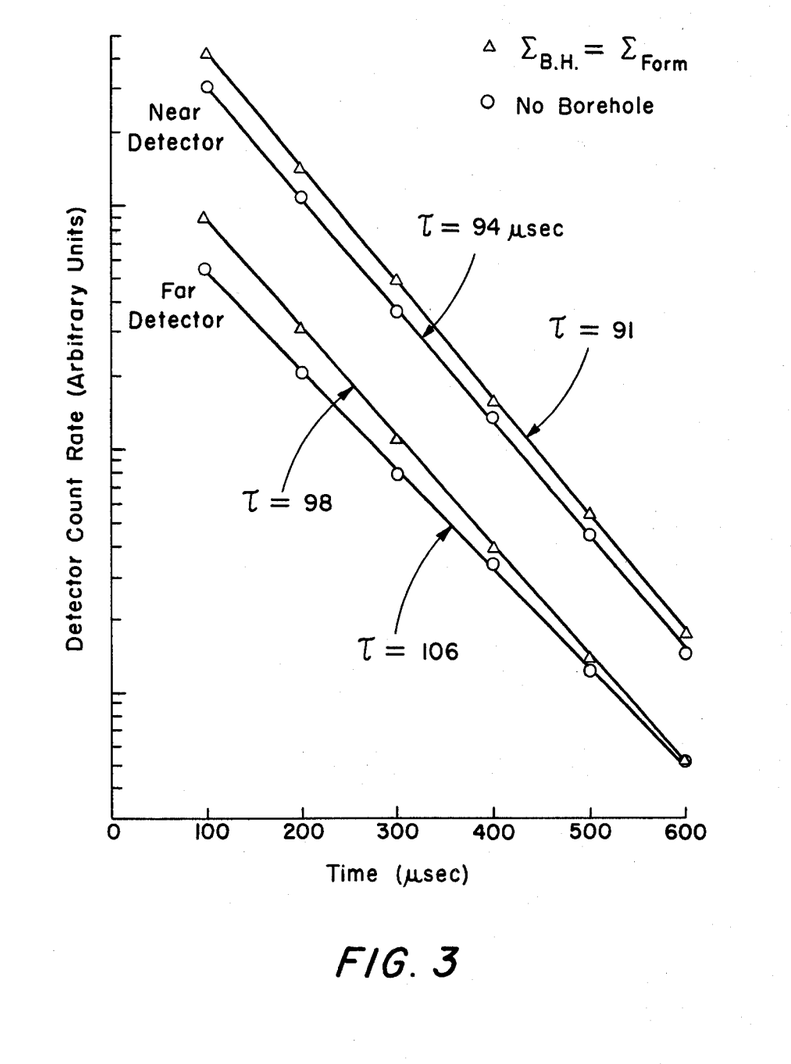
FIG. 3 is a graphical comparison of near and far detector count rates vs. time for a 36% porosity, salt water-saturated sandstone formation with (1) no borehole (infinite formation) and (2) 10-inch open borehole.

Calculations for an infinite medium of formation, i.e. no borehole, consisting of 36% porosity sandstone with saturated salt water is shown in FIG. 3. The $\tau$ calculated at the near detector is very close to the intrinsic $\tau$ of 95 $\mu$ sec, whereas the calculated $\tau$ at the far detector, consistent with the conclusion drawn from FIG. 2, is about 10% higher. FIG. 3 also shows the results for the same formation with the addition of a borehole having the same capture cross section ($\Sigma_{BH}$) as the formation $\Sigma$. The effect of a borehole with the same capture cross section as the formation is to reduce the computed $\tau$ at both the near and far detectors. Part of this reduction in $\tau$ is the result of the longer mean free path of 14 MeV. neutrons in the borehole compared to the formation, which produces a virtual source of neutrons closer to the detectors. This results in an increase of the thermal neutron density in the vicinity of the borehole. The overall effect is that, with a borehole, the computed $\tau$ at the far detector is close to the intrinsic $\tau$ and the near $\tau$ is less than the intrinsic value. Also, the effect of the borehole is to substantially increase the count rate at both detectors.

For an infinite medium with densities ranging from 1.0 to 2.7 gm/cm$^3$ or for formations with a borehole having the same capture cross section as the formation, it has been found that the computed $\tau$ at both the near and far detector are within 10% of the intrinsic $\tau$. Also, the near detector $\tau_N$ is about 10% lower than $\tau_F$ for the far detector.

There is also a spatial variation in $\tau$ measured depending upon the type of detector used. Comparative measurements of $\tau$ versus the distance from the source made in the simple case of a fresh water tank using thermal neutron detectors, on the one hand, and gamma ray detectors, on the other hand, show that the distance from the source at which the measured $\tau$ equals the intrinsic $\tau$ is greater for gamma ray measurements than for neutron measurements. As previously measured, the calculations reflected in FIGS. 2-5 hereof were made using source-to-detector spacings of approximately thirteen inches and twentyfive inches for the near and far detectors 28 and 30, respectively. The detectors were sodium-iodide gamma ray detectors.

The foregoing data and observations allow the derivation of an empirical relationship for correction of the measured $\tau$ for spatial and borehole effects having the following general form:

$$\tau = \tau_F + A(\tau_F - \tau_N B) + C \quad (1)$$

As pointed out above in connection with FIG. 3, if there is no borehole present $\tau$ measurements over a broad range of realistic formation conditions show a substantially uniform 10% difference between $\tau_N$ and $\tau_F$, with $\tau_F$ being larger. This difference, which is a result of the spatial shift in neutron density between the near and far detectors, is accounted for in Eq. (1) by the term B. The value of B may vary slightly depending on the porosity and lithology, e.g., within the range of from 1.0 to 1.2, but generally may be taken as 1.1.

It has also been shown from FIG. 2 that the measured $\tau_N$ and $\tau_F$ each have a borehole component and a formation component, with $\tau_F$ having approximately twice as much formation component as $\tau_N$. Although this relationship between $\tau_N$ and $\tau_F$ may vary somewhat with borehole size and casing size and for open hole, e.g. within the range of 1 to 5, it too is comparatively uniform over a fairly wide range of parameters. Hence, in the general case, the A term in Eq. (1) may be taken as 0.5.

The C term in Eq. (1) is a constant which compensates for observed differences between $\tau_F$ and $\tau_{INT}$ that are thought to result at least in part from the source-to-detector spacings used and the time delay after burst chosen in measuring $\tau$. A value of C of 10 $\mu$sec has been found adequately to compensate for these factors for the parameters assumed herein, i.e., source-to-detector spacings of approximately thirteen and twenty-five inches and a time delay of $2\tau$.

Figure 4:
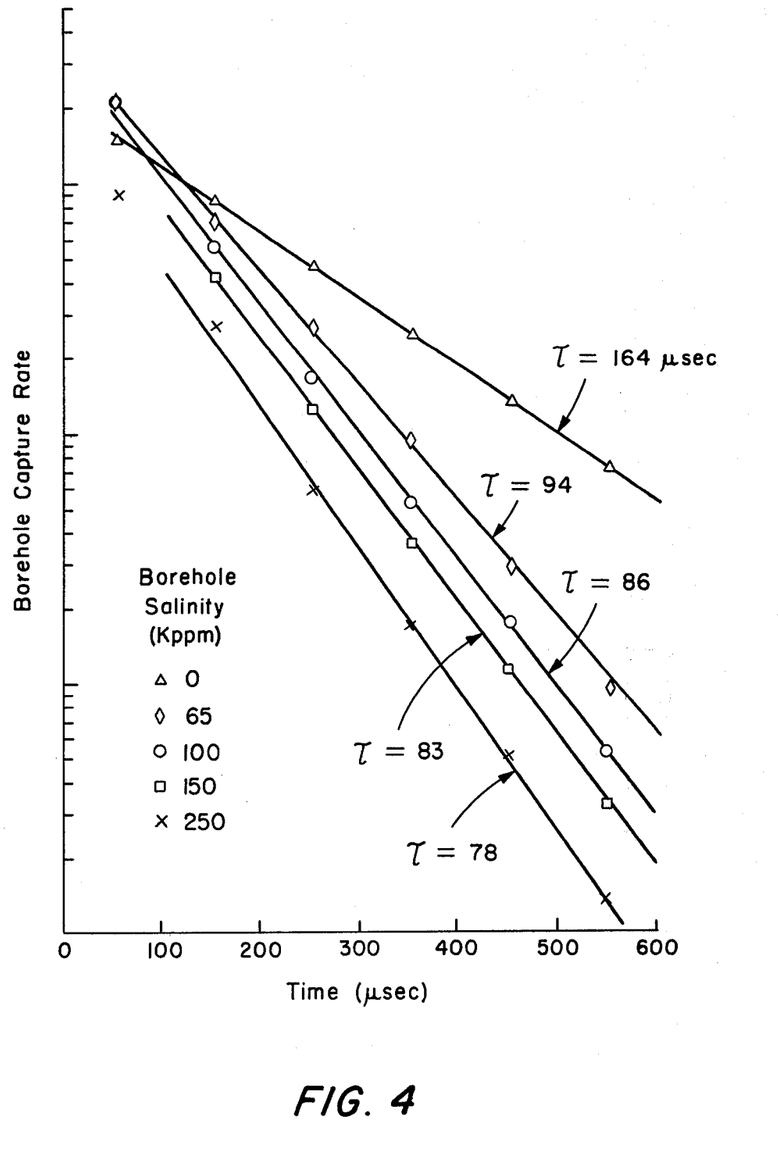
FIG. 4 is a graphical representation of the variation of borehole capture rate vs. time with borehole salinity for a 36% porosity, salt water-saturated formation with a 10-inch open borehole.

It has also been found that the measured $\tau$ is influenced by variations in the borehole capture cross section relative to the formation $\Sigma$. This is illustrated in FIG. 4, which depicts calculated borehole capture rates for a 10-inch borehole with various salinities in a sandstone formation with a 36% porosity containing saturated salt water ($\tau_{INT}=95$ $\mu$sec). A borehole salinity of 65 Kppm corresponds to the same capture cross section as that of the formation. FIG. 4 shows that, as the salinity of the borehole is increased, the borehole capture rate after a $2\tau$ delay decreases, but that the $\tau$ for the borehole decay rate approaches an asymptotic value. Hence the effect of the borehole capture cross section ($\Sigma_{BH}$) on the measured $\tau$ depends on both (1) the relative magnitude of the borehole and formation capture rates and (2) the values of the borehole and the formation $\tau$. Depending on the relative variation of these terms, the borehole correction term ($\Delta\Sigma_{BH}$) to the measured $\Sigma$ can be multivalued. This effect has been seen in both the calculations and laboratory data. For effective borehole capture cross sections less than that of the formation, this correction will change sign.

Figure 5:
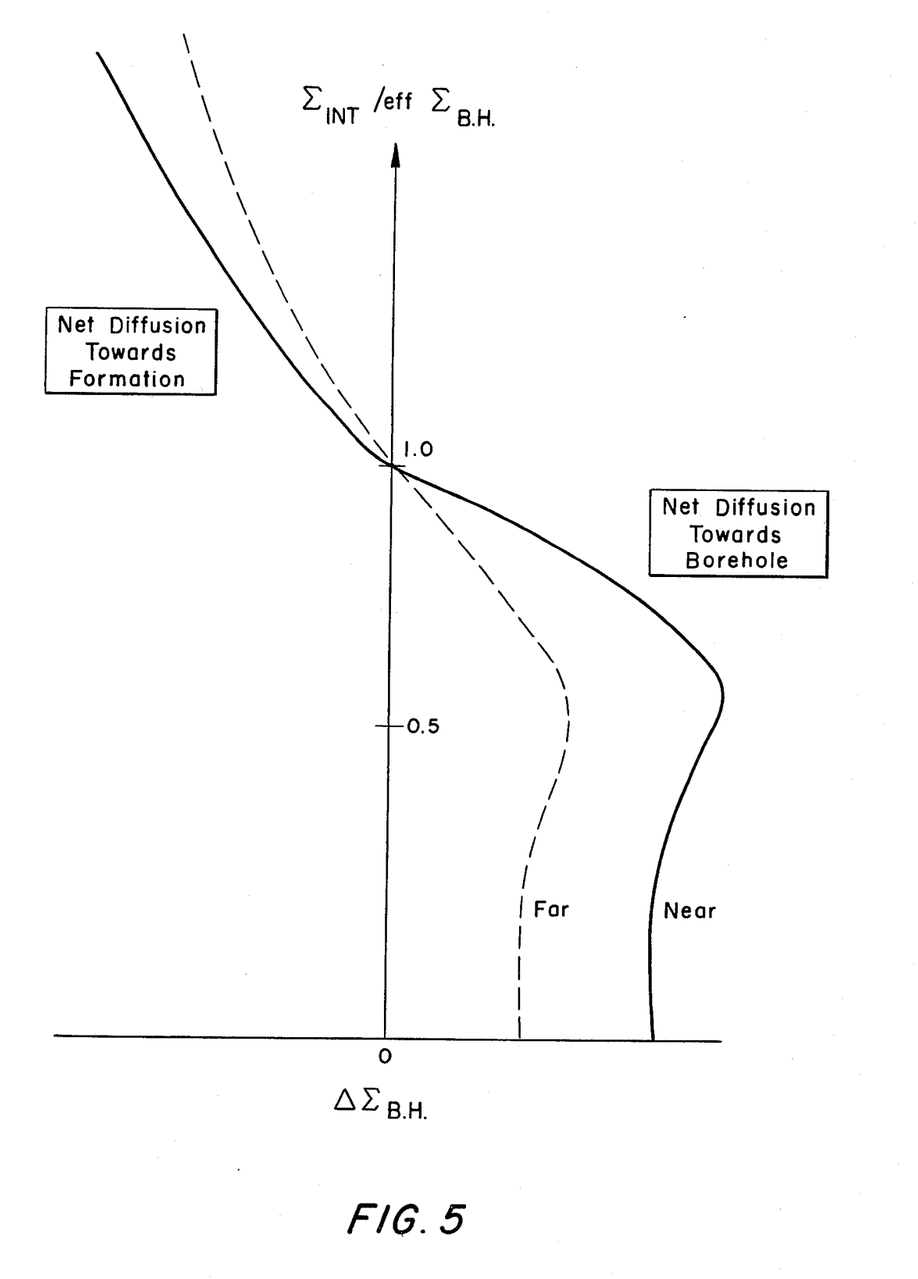
FIG. 5 is a plot of the manner in which the borehole capture effect term ($\Delta\Sigma_{BH}$) varies with the ratio of the intrinsic formation capture cross section ($\Sigma_{INT}$) to the effective borehole capture cross section (eff.$\Sigma_{BH}$)

FIG. 5 illustrates how the borehole capture effect term ($\Delta\Sigma_{BH}$) varies with the ratio of the intrinsic formation $\Sigma$ to an effective borehole capture cross section (eff.$\Sigma_{BH}$). The effective borehole capture cross section is defined hereinafter for cased holes, but for the open holes it is just the borehole capture cross section ($\Sigma_{BH}$). These facts, that the near and far detectors have different borehole corrections and that the far detector correction is smaller, allow the use of these two measurements to correct the measured $\tau$ and $\Sigma$ to a value closer to the intrinsic values. Another implication of FIG. 5 is that the corrections are slowly varying when the effective borehole capture cross section is much greater than the formation cross section. However, the correction term varies rapidly when the effective borehole and formation cross sections are about equal. Since the formation and borehole capture cross sections are never known exactly, for departure curves to work well the effective borehole capture cross section must be substantially higher than that of the formation. Also, in time-lapse logging, normalizing the corrections from the initial log is a good approximation only if the above condition is met.

The effect of change in borehole capture cross section on the measured $\tau$ may be more accurately taken into account by determining the A term in Eq. (1) in accordance with the following:

$$A = 0.5(1 + 0.5\Sigma/\text{eff.}\Sigma_{BH}) \quad (2)$$

where $\Sigma$ is the formation cross section, and eff. $\Sigma_{BH}$ is the effective borehole capture cross section.

Only for an open hole configuration is eff. $\Sigma_{BH}$ uniquely defined, i.e. it is the borehole cross section $\Sigma_{BH}$. For a cased hole, the following equation can be used to determine the effective borehole capture cross section:

$$\text{eff. } \Sigma_{BH} = \frac{\int \Sigma(r_i)\Psi(r_i)dA_b}{\int \Psi(r_i)dA_b} \quad (3)$$

where:
  $r_i$ is the thickness of each material i (=1,2, ... n) material in the borehole;
  $\Sigma(r_i)$ is the capture cross section for the material i;
  $\Psi(r_i)$ is the thermal neutron flux in the material i; and
  $A_b$ is the area of the borehole.

The application of Eq. (3) to a typical cased borehole may be seen by reference to FIG. 6, which models the situation where eff. $\Sigma_{BH}$ is greater than the formation $\Sigma$ and the thermal neutron flux in the borehole is due largely to neutrons diffusing in from the formation at late times. The effective borehole cross section for this borehole configuration would be calculated, using Eq. (3), as follows:

$$\text{eff. } \Sigma_{BH} = \frac{\int [\Sigma(r_i)\Psi(r_i) + \Sigma(r_2)\Psi(r_2) + \Sigma(r_3)\Psi(r_3)]dA_b}{\int [\Psi(r_i) + \Psi(r_2) + \Psi(r_3)]dA_b}$$

For the case where eff. $\Sigma_{BH}$ is greater than the formation $\Sigma$ the neutron flux $\Psi(r)$ in the various borehole materials can be approximated by a diffusion kernel:

$$\Psi(r_i) = \frac{e^{-Kr_i}}{Dr_i} \quad (4)$$

where

D is the thermal neutron diffusion coefficient;
$K = \sqrt{\Sigma_i/D}$, and
$\Sigma_i$ is the thermal neutron capture cross section of the material i.

By way of example, this approximate model gives effective borehole capture cross sections for freshwater cement, as shown in Table II.

TABLE II

| Borehole Diameter | Casing Diameter | Eff $\Sigma_{BH}$ with Fresh Water in Borehole (c.u.) | Eff $\Sigma_{BH}$ with Saturated Salt Water in Borehole (c.u.) |
|---|---|---|---|
| 10" | 5¼" | 22 | 26 |
| 10" | 7" | 27 | 37 |
| 12" | 9⅝" | 33 | 47 |

The prior art departure curves will work well when the formation capture cross section $\Sigma$ is less than the values given in Table II, but not where $\Sigma$ is greater than those values.

As previously mentioned in connection with FIG. 4, the borehole correction term varies slowly when eff.$\Sigma_{BH}$ is much greater than the formation $\Sigma$. In this case, greater statistical precision in $\tau$ measured can be achieved by averaging the term $A(\tau_F - \tau_N B)$ from Eq. (1) over a longer period of time than that for each $\tau_N$ and $\tau_F$ measurement. The value of A from Eq. (2) may be averaged over a greater time than for each $\tau$ measurement, e.g., over a predetermined number of $\tau$ intervals. In such case, the computer 36 would calculate A from Eq. (2) using for $\Sigma$ therein the value of $\Sigma$ as measured over the preceding "averaging" time interval and would then use this "averaged" value of A to compute $\tau$ measured from Eq. (1). If it is not desired to average the A term, the value of $\Sigma$ used in Eq. (2) would be the measured value thereof from the next preceding $\tau$ measurement. In either case, the correction of term A would thus be updated periodically in the course of a log.

Although the invention has been described herein with reference to specific embodiments thereof, it will be understood that such embodiments are susceptible of variation and modification without departing from the inventive concepts disclosed. All such variations and modifications, therefore, are intended to be included within the spirit and scope of the appended claims.

We claim:

1. A method for deriving an environmentally-corrected measurement of the thermal neutron decay time of an earth formation traversed by a borehole, comprising:

irradiating the earth formation with discrete bursts of high-energy neutrons from a source located within the borehole to produce therein between bursts a population of thermal neutrons;

detecting indications of the change in the thermal neutron population with time between neutron bursts at each of first and second locations within the borehole, said first location being spaced closer to the neutron source than said second location;

deriving first and second measurements of the thermal neutron decay time of the formation from said first and second detected indications, respectively; and combining said first and second thermal neutron decay time measurements in accordance with a previously established empirical relationship, including a correction coefficient for correcting for the effects of neutron diffusion and a correction coefficient for correcting for the effects of borehole capture cross section, to provide a corrected measurement of the thermal neutron decay time of the formation.

2. The method of claim 1, wherein said previously established empirical relationship has the general form of:

$$\tau = \tau_F - A(\tau_F + \tau_N B) + C,$$

where:

$\tau$ is the corrected-measurement of the formation thermal neutron decay time, $\tau_F$ is the thermal neutron decay time measured at said second location, $\tau_N$ is the thermal neutron decay time measured at said first location, A is a correction coefficient for borehole capture cross section effects, B is a correction coefficient for neutron diffusion effects, and C is a constant.

3. The method of claim 2, wherein A has the value of substantially 0.5, B has the value of substantially 1.1, and C has the value of substantially 10 $\mu$sec.

4. The method of claim 2, wherein A is determined in accordance with the relationship:

$$A = 0.5 \, (1 + 0.5 \, \Sigma/\text{eff.}\Sigma_{BH})$$

where $\Sigma$ is the formation thermal neutron capture cross section, and eff.$\Sigma_{BH}$ is the effective thermal neutron capture cross section of the borehole.

5. The method claim 4, wherein eff.$\Sigma_{BH}$ is determined in accordance with the relationship:

$$\text{eff. } \Sigma_{BH} = \frac{\int \Sigma(r_i)\Psi(r_i)dA_b}{\int \Psi(r_i)dA_b}$$

where:

$r_i$ is the thickness of each material i = 1, 2, ... n in the borehole, $\Sigma(r_i)$ is the thermal neutron capture cross section for the material i;

$\Psi(r_i)$ is the thermal neutron flux in the material i, and $A_b$ is the area of the borehole.

6. The method of claim 5, wherein $\Psi(r_i)$ is determined in accordance with the relationship:

$$\Psi(r_i) = \frac{e^{-Kr_i}}{Dr_i}$$

where:

D is the thermal neutron diffusion coefficient;
$K = \sqrt{\Sigma_i/D}$, and $\Sigma_i$ is the thermal neutron capture cross section of the material i.

7. The method of either claim 1 or 2 further comprising the step of recording said corrected thermal neutron decay time measurement as a function of depth within the borehole.

8. The method of claim 1, wherein the correction coefficient for correcting for the effects of neutron diffusion and the correction coefficient for correcting for the effects of borehole capture cross section are combined in accordance with said previously established empirical relationship to modify one of said thermal neutron decay time measurements to provide a corrected measurement of the thermal neutron decay time of the formation.

9. Apparatus for deriving an environmentally-corrected measurement of the thermal neutron decay time of an earth formation traversed by a borehole, comprising:
  a logging tool;
  neutron source means in said logging tool for irradiating the earth formation with discrete bursts of high-energy neutrons to produce therein between bursts a population of thermal neutrons;
  first and second detector means located in said logging tool at first and second distances, respectively, from said neutron source for detecting indications of the change in the thermal neutron population with time between neutron bursts;
  means for deriving first and second measurements of the thermal neutron decay time from said respective first and second detected indications; and
  means for combining said first and second thermal neutron decay time measurements in accordance with a previously established empirical relationship, including a correction coefficient for correcting for the effects of neutron diffusion and a correction coefficient for correcting for the effects of borehole capture cross section, to provide a corrected measurement of the thermal neutron decay time of the formation.

10. The apparatus of claim 9, wherein: said previously established empirical relationship has the general form of:

$$\tau = \tau_F + A(\tau_F - \tau_N B) + C,$$

where:
  $\tau$ is the corrected-measurement of the formation thermal neutron decay time,
  $\tau_F$ is the thermal neutron decay time measured at said second location,
  $\tau_N$ is the thermal neutron decay time measured at said first location,
  A is a correction coefficient for borehole capture cross section effects,
  B is a correction coefficient for neutron diffusion effects, and
  C is a constant related to tool parameters.

11. The apparatus of claim 10 wherein A has the value of substantially 0.5, B has the value of substantially 1.1, and C has the value of substantially 10 $\mu$sec.

12. The apparatus of claim 10 wherein A is determined in accordance with the relationship:

$$A = 0.5(1 + 0.5\, \Sigma/\text{eff}.\Sigma_{BH})$$

where $\Sigma$ is the formation thermal neutron capture cross section, and
eff.$\Sigma_{BH}$ is the effective thermal neutron capture cross section of the borehole.

13. The apparatus of claim 12 wherein eff. $\Sigma_{BH}$ is determined in accordance with the relationship:

$$\text{eff. } \Sigma_{BH} = \frac{\int \Sigma(r_i)\Psi(r_i)dA_b}{\int \Psi(r_i)dA_b}$$

where:
  $r_i$ is the thickness of each material i = 1, 2, ... n in the borehole,
  $\Sigma(r_i)$ is the thermal neutron capture cross section for the material i;
  $\Psi(r_i)$ is the thermal neutron flux in the material i, and
  $A_b$ is the area of the borehole.

14. The apparatus of claim 13 wherein $\Psi(r_i)$ is determined in accordance with the relationship:

$$\Psi(r_i) = \frac{e^{-Kr_i}}{Dr_i}$$

where:
  D is the thermal neutron diffusion coefficient;
  $K = \sqrt{\Sigma_i/D}$, and
  $\Sigma_i$ is the thermal neutron capture cross section of the material i.

15. The apparatus of either claim 9 or 10 further comprising means for recording said corrected thermal neutron decay time measurement as a function of depth within the borehole.

16. The apparatus of claim 9, wherein the correction coefficient for correcting for the effects of neutron diffusion and the correction coefficient for correcting for the effects of borehole capture cross section are combined in accordance with said previously established empirical relationship to modify one of said thermal neutron decay time measurements to provide a corrected measurement of the thermal neutron decay time of the formation.

17. A method for deriving an environmentally-corrected measurement of the thermal neutron decay time of an earth formation traversed by a borehole from detected indications of the change with time, following irradiation of the borehole and the formation with discrete bursts of high energy neutrons, of the thermal neutron populations in the borehole and the formation at first and second spaced locations along the borehole from the neutron source, comprising:
  deriving first and second measurements of the thermal neutron decay time of the formation from said first and second detected indication, respectively; and
  combining said first and second thermal neutron decay time measurements in accordance with a previously established empirical relationship, including a correction coefficient for correcting for the effects of neutron diffusion and a correction coefficient for correcting for the effect of borehole capture cross section, to provide a corrected measurement of the thermal neutron decay time of the formation.

18. The method of claim 17, wherein said previously established empirical relationship has the general form of:

$$\tau = \tau_F + A(\tau_F - \tau_N B) + C,$$

where:
- $\tau$ is the corrected measurement of the formation thermal neutron decay time,
- $\tau_F$ is the thermal neutron decay time measured at the farther of said first and second locations from the neutron source,
- $\tau_N$ is the thermal neutron decay time measured at the nearer of said first and second locations to the neutron source,
- A is a correction coefficient for borehole capture cross section effects,
- B is a correction coefficient for neutron diffusion effects, and
- C is a constant.

19. The method of claim 18, wherein A has the value of substantially 0.5, B has the value of substantially 1.1, and C has the value of substantially 10 $\mu$sec.

20. The method of claim 18, wherein A is determined in accordance with the relationship:

$$A = 0.5(1 + 0.5 \, \Sigma/\text{eff}.\Sigma_{BH})$$

where
- $\Sigma$ is the formation thermal neutron capture cross section, and
- eff. $\Sigma_{BH}$ is the effective thermal neutron capture cross section of the borehole.

21. The method of claim 20, wherein eff.$\Sigma_{BH}$ is determined in accordance with the relationship:

$$\text{eff. } \Sigma_{BH} = \frac{\int \Sigma(r_i) \Psi(r_i) dA_b}{\int \Psi(r_i) dA_b}$$

where:
- $r_i$ is the thickness of each material $i = 1, 2, \ldots n$ in the borehole,
- $\Sigma(r_i)$ is the thermal neutron capture cross section for the material i;
- $\Psi(r_i)$ is the thermal neutron flux in the material i, and
- $A_b$ is the area of the borehole.

22. The method of claim 21, wherein $\Psi(r_i)$ is determined with the relationship:

$$\Psi(r_i) = \frac{e^{-Kr_i}}{Dr_i}$$

where:
- D is the thermal neutron diffusion coefficient;
- $K = \sqrt{\Sigma_i/D}$; and
- $\Sigma_i$ is the thermal neutron capture cross section of the material i.

23. The method of either claim 17 or 18 further comprising the step of recording said corrected thermal neutron decay time measurement as a function of depth within the borehole.

24. The method of claim 17, wherein the correction coefficient for correcting for the effects of neutron diffusion and the correction coefficient for correcting for the effects of borehole capture cross section are combined in accordance with said previously established empirical relationship to modify one of said thermal neutron decay time measurements to provide a corrected measurement of the thermal neutron decay time of the formation.

* * * * *

UNITED STATES PATENT AND TRADEMARK OFFICE
CERTIFICATE OF CORRECTION

PATENT NO. : 4,445,033
DATED : April 24, 1984
INVENTOR(S) : Preeg et al.

It is certified that error appears in the above-identified patent and that said Letters Patent is hereby corrected as shown below:

Col. 8, Line 2, "$\Sigma$" should read -- $\tau$ --;

Col. 10, line 18, "$\tau = \tau_F - A(\tau_F + \tau_N B) + C$" should read -- $\tau = \tau_F + A(\tau_F - \tau_N B) + C$ --;

Col. 12, line 61, "effect" should read -- effects --;

Col. 14, line 13, before "with" insert -- in accordance --;

Col. 14, line 16, "$\Psi(r_i) = \dfrac{e-Kr_i}{Dr_i}$" should read -- $\Psi(r_i) = \dfrac{e^{-Kr_i}}{Dr_i}$ --

Signed and Sealed this

Fifth Day of February 1985

[SEAL]

Attest:

DONALD J. QUIGG

Attesting Officer  Acting Commissioner of Patents and Trademarks

UNITED STATES PATENT AND TRADEMARK OFFICE
CERTIFICATE OF CORRECTION

PATENT NO. : 4,445,033
DATED : April 24, 1984
INVENTOR(S) : Preeg et al.

It is certified that error appears in the above-identified patent and that said Letters Patent is hereby corrected as shown below:

On the title page;

<u>Abstract</u>, first page, second column, change the equation from "$\tau=\tau_F + A(\tau_F + \tau_N B)+C$" to --$\tau=\tau_F + A(\tau_F - \tau_N B)+C$--.

Column 10, line 46, after the word "method" insert --of--.

Signed and Sealed this

Thirteenth Day of August 1985

[SEAL]

*Attest:*

DONALD J. QUIGG

*Attesting Officer*    *Acting Commissioner of Patents and Trademarks*